United States Patent
Zadoyan et al.

(10) Patent No.: US 7,522,642 B2
(45) Date of Patent: Apr. 21, 2009

(54) METHOD AND SYSTEM FOR LASER AMPLIFICATION USING A DUAL CRYSTAL POCKELS CELL

(75) Inventors: Ruben Zadoyan, Irvine, CA (US); Michael Karavitis, Seal Beach, CA (US)

(73) Assignee: AMO Development LLC, Santa Ana, CA (US)

( * ) Notice: Subject to any disclaimer, the term of this patent is extended or adjusted under 35 U.S.C. 154(b) by 415 days.

(21) Appl. No.: 11/392,191

(22) Filed: Mar. 29, 2006

(65) Prior Publication Data

US 2007/0236771 A1    Oct. 11, 2007

(51) Int. Cl.
 *H01S 3/10* (2006.01)
 *H01S 3/11* (2006.01)
 *H01S 3/115* (2006.01)
 *G02F 1/03* (2006.01)

(52) U.S. Cl. ............. 372/12; 372/10; 372/20; 372/9; 359/257

(58) Field of Classification Search ............. 359/245, 359/257; 372/9, 10, 12, 20
See application file for complete search history.

(56) References Cited

U.S. PATENT DOCUMENTS

| | | | |
|---|---|---|---|
| 3,408,593 A | 10/1968 | Hurwitz, Jr. ........... 331/94.5 |
| 3,429,636 A | 2/1969 | Wentz ............... 350/160 |
| 3,443,857 A | 5/1969 | Warter, Jr. ........... 350/150 |
| 3,473,031 A | 10/1969 | White ............... 250/199 |
| 3,571,744 A | 3/1971 | Hook ............... 331/94.5 |
| 3,679,289 A | 7/1972 | Goldstein ........... 350/150 |
| 3,719,414 A | 3/1973 | Wentz ............... 350/150 |
| 3,820,038 A | 6/1974 | Tomlinson ........... 331/94.5 |
| 4,053,763 A | 10/1977 | Harney ............... 250/206 |
| 4,059,759 A | 11/1977 | Harney et al. ........ 250/206 |
| 4,335,939 A | 6/1982 | Stovell et al. ........ 350/385 |
| 4,575,849 A | 3/1986 | Chun ............... 372/9 |
| 4,641,312 A | 2/1987 | Schafer et al. ........ 372/25 |
| 4,643,534 A | 2/1987 | Chun et al. .......... 350/403 |
| 4,698,816 A | 10/1987 | Chun ............... 372/19 |
| 5,001,716 A | 3/1991 | Johnson et al. |
| 5,157,539 A | 10/1992 | Beasley ............. 359/251 |
| 5,221,988 A | 6/1993 | Juhasz .............. 359/247 |
| 5,548,234 A | 8/1996 | Turi et al. ........... 327/108 |
| 5,557,625 A | 9/1996 | Durville ............ 372/29 |
| 5,742,634 A | 4/1998 | Rieger et al. ........ 372/25 |
| 5,790,303 A | 8/1998 | Weston et al. ....... 359/345 |
| 6,197,133 B1 | 3/2001 | Unternahrer et al. |
| 6,462,307 B1 | 10/2002 | Hennig et al. ........ 219/121.77 |
| 6,882,469 B2 | 4/2005 | Tamaki et al. ........ 359/348 |
| 7,068,688 B2 * | 6/2006 | Zou et al. ........... 372/12 |
| 7,130,318 B2 * | 10/2006 | Wang et al. ......... 372/10 |
| 2004/0075892 A1 | 4/2004 | Tamaki et al. ........ 359/348 |
| 2005/0157381 A1 | 7/2005 | Kafka et al. ......... 359/346 |
| 2005/0226287 A1 | 10/2005 | Shah et al. .......... 372/25 |

OTHER PUBLICATIONS

International Search Report and Written Opinion of PCT Application No. PCT/US07/05050, dated Aug. 21, 2008, 7 pages total.

* cited by examiner

*Primary Examiner*—William C Choi
*Assistant Examiner*—Jack Dinh

(57) ABSTRACT

A system for laser amplification includes a dual-crystal Pockels cell which is used to control emission of laser pulses from an ultra-fast laser. The Pockels cell is constructed to enable adjustment of the rotational orientation of one crystal relative to the other crystal. The rotational orientation of one or both crystals in the Pockels cell is adjusted to control sidebands in the laser pulse.

5 Claims, 3 Drawing Sheets

FIG. 3
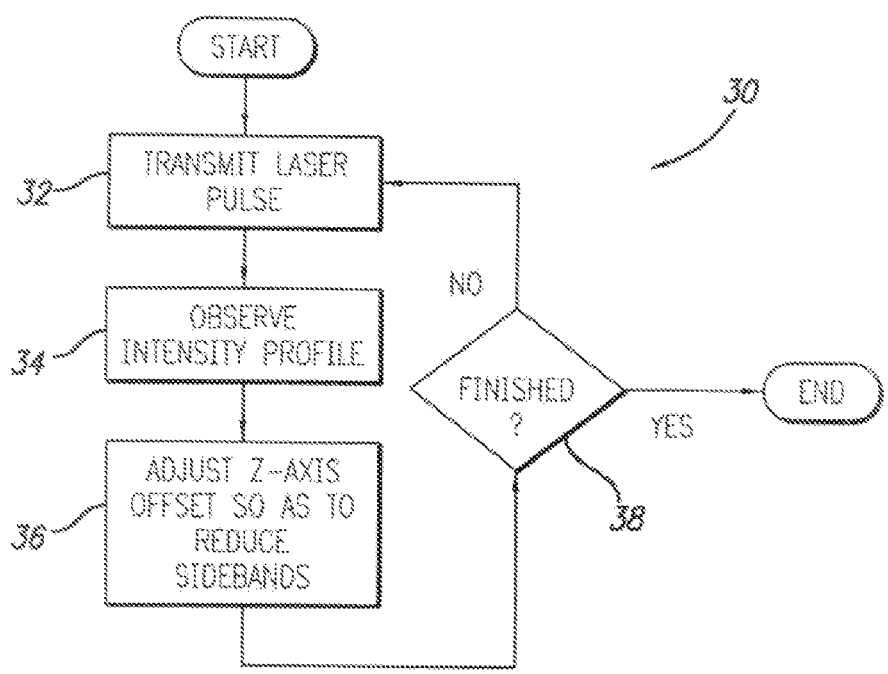
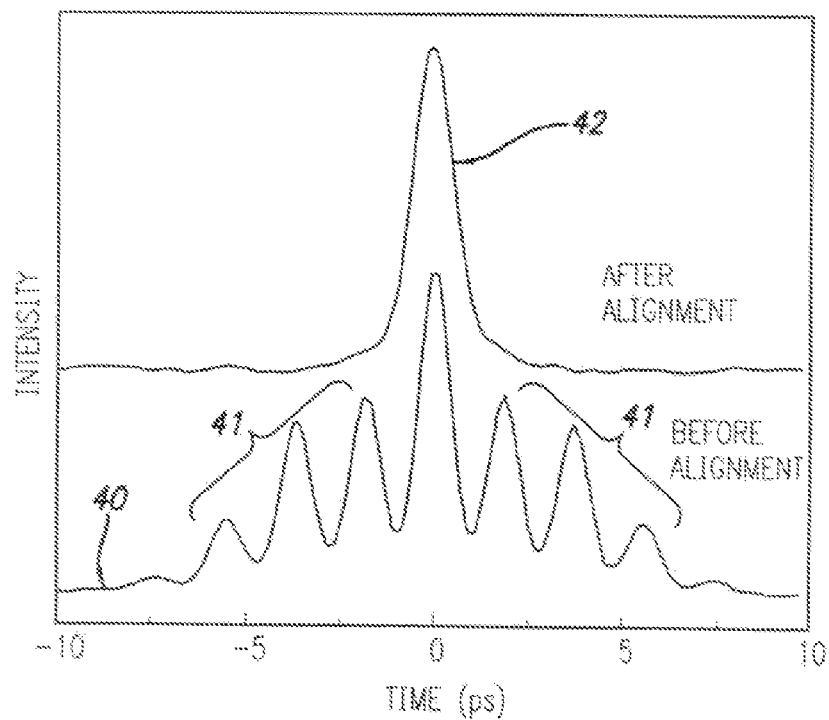
FIG. 4

METHOD AND SYSTEM FOR LASER AMPLIFICATION USING A DUAL CRYSTAL POCKELS CELL

BACKGROUND OF THE INVENTION

1. Field of the Invention

The present invention relates to laser amplification and optical switching systems, including but not limited to Pockels cells used for controlling light in lasers, optical switches, and other applications.

2. Description of Related Art

Electro-optical materials operate to change the polarization of a light beam in response to the application of an electrical voltage across the material. These materials are often used in combination with polarizers as electro-optical switches. In lasers or other optical systems, electro-optical materials are often configured as Pockels cells. Depending on the type and geometry of electro-optical material and the level of applied voltage, the polarization of a light beam can be varied to selectively pass a polarizer which has a predetermined polarization orientation. Thus, the transmission of a beam can be controlled as desired by application of a voltage.

Various different configurations of Pockels cell are known in the art for amplification of laser light, optical switching, and other applications. In one application for laser amplification, a laser medium in a regenerative amplifier cavity is pumped to generate an excess of excited atoms in the medium. A Pockels cell is then activated to capture a seed pulse in the cavity. The seed pulse is amplified by repeatedly passing through the laser medium. After a period of time, voltage is removed from the Pockels cell, thereby changing its polarization and causing the amplified pulse to be emitted from the cavity.

Dual-crystal Pockels cells with thermal compensation based on transverse effect are known in the art for providing optical switching using reduced control voltages. The dual-crystal Pockels cell uses two crystals in series, which reduces the magnitude of the applied voltage required to activate the cell. These are usually biaxial crystals and compensation is made for natural birefringence, which usually has a strong thermal dependence, by specially orienting the two crystals such that the beam passes along the X axis (for X-cut crystals) or the Y axis (for Y-cut crystals). Input beam polarization is directed at 45° with respect to the Y and Z axes, or alternatively the X and Z axes, depending on the crystal cut. The second crystal is rotated so that the Z axes of the two crystals sit at 90° relative to each other. The two crystals are also generally polished together to have matched lengths. The remainder of the discussion below assumes use of biaxial Y-cut crystals, with the understanding that the entire discussion equally applies to biaxial X-cut crystals.

The two crystals share a common central electrical contact. Voltage is applied between the common center electrode and the end electrodes, resulting in additive polarization change. Pockels cells of dual-crystal design have proven useful for Q-switched lasers where pulses in the range of 1 ns to 1000 ns are commonly generated, and for regenerative amplifiers in lasers where pulses in the range of 5 picoseconds to 1000 picoseconds are commonly generated. Short pulse widths in the range of about 30 femtoseconds to about 5 picoseconds are desirable for many applications, such as surgery or micromachining, to precisely ablate targeted areas without damaging surrounding material.

Dual crystal Pockels cells are customarily constructed so as to ensure that their crystal structures are aligned. The pitch and yaw of the two crystals, i.e., their rotational orientation for Y-cut crystals with respect to the Z and X axes, respectively, is controlled using mounting fixtures to ensure that the Y axes of the two crystals are parallel. The extinction ratio of the dual-crystal Pockels cell depends on the precision with which the Y axes of the two crystals are parallel. The dual crystals are customarily factory-installed in a structure so as to achieve the desired axial alignment, and locked into position. Normally, this alignment is fixed and not adjustable. The amount of precision in this alignment, however, is directly related to the extinction ratio of the emitted pulse.

In addition, the crystals in a dual-crystal Pockels cell are rotated around their Y axes with respect to one another to achieve thermal compensation. The amount of rotation is nominally 90°, such that one crystal of the pair is rotated around its Y axis by this amount, relative to the Z (or X) axis of the other crystal. Again, the crystals are normally factory-installed with this rotational offset, and it too is not normally adjusted during operation of the Pockels cell. The precision of this rotational offset is generally about ±60 minutes.

Notwithstanding the advantages of dual crystal Pockels cells and systems that employ them, these systems are subject to certain disadvantages, notably when used in regenerative amplifiers for amplification of laser pulses of about 30 femtosecond to about 5 picoseconds. Laser pulses from high repetition rate lasers tend to occur with sidebands, which reduces the peak laser intensity. These sidebands may not be observable for slower pulses, for example, pulses in the 5 picosecond or longer range. However, such sidebands become readily apparent for laser pulses on the order of picoseconds or shorter. Control of these sidebands, whether to increase the intensity of the peak pulse or for more control over the shape of the peak pulse and the resulting sidebands, is desirable.

SUMMARY OF THE INVENTION

The present invention provides a method and apparatus for altering pulse sidebands in a laser amplification system that uses one or more dual-crystal Pockels cells to control the amplification in a laser. The invention further provides a method and system for rotational orientation of electro-optical elements in an optical switch, such as, for example, the crystals in a dual-crystal Pockels cell. The invention may also be applied in other optical systems using a dual-crystal Pockels cell or comparable optical switch to switch ultra-fast laser pulses.

According to an aspect of the invention, a dual-crystal Pockels cell is provided with an adjustable mount which permits at least one of the crystals in the pair to be rotated a small amount relative the optical axis (also referred to as the Y axis). The mount may also orient and align the crystals with respect to the X and Z axes. Advantageously, the mount is configured to be adjustable during operation of the optical system it is to be used with. For example, for a Pockels cell that is used as part of a regenerative laser amplifier, the mount is preferably configured to be adjustable while the laser is operating to enable fine tuning of the amplifier on a system-by-system basis.

In an embodiment of the invention, the crystals are mounted against fixed reference surfaces of a mount for X axis and Z axis alignment. The mount sets the relative angular displacement of the crystals about the Y axis, i.e., the Z axis of one crystal has an angular offset with respect to the Z axis of the other crystal, to a predetermined nominal amount. For example, the crystals may be set to have a relative angular displacement of 90°. The mount is further configured to allow fine adjustments in the amount of relative angular displacement between the two crystals. Various mount configurations may be suitable. The Pockels cell with its adjustable mount is then deployed in the desired optical system.

The adjustable mount can be used to reduce, eliminate, or otherwise alter sidebands that are observed in ultra-fast laser pulses switched through prior-art Pockels cells. To do so, the pulse shape is observed as the rotational alignment of the crystals about the Y axis is adjusted using the adjustable mounting system. The sidebands of the laser pulse, through proper rotational orientation of the Pockels cells, may be minimized, eliminated, or set to a desired level. The relative rotational alignment of the two crystals is then maintained during operation of the laser or other optical system.

According to the foregoing, therefore, an optical switch comprises a first mount holding a first electro-optical element and a second mount holding a second electro-optical element in optical alignment with the first electro-optical element. The first and second mounts are adapted to angularly position the first and second electro-optical elements about an optical axis and to angularly displace the electro-optical elements with respect to one another by an offset angle about the optical axis. An angular adjustment device is operably associated with the second mount and is adapted to adjust the offset angle by an adjustment amount.

In addition, the method comprises placing first and second electro-optical elements into an optical cavity, each electro-optical element being angularly displaced with respect to the other by an offset angle about an optical axis of the optical cavity. A seed pulse is directed into the optical cavity. The electro-optical elements are controlled such that the seed pulse is first amplified then emitted from the optical cavity as a laser pulse. The intensity profile of the laser pulse is observed, and the offset angle is adjusted so as to adjust sidebands observed in the intensity profile.

A more complete understanding of the system and method for reducing or eliminating sidebands in an optical system will be afforded to those skilled in the art, as well as a realization of additional advantages and objects thereof, by a consideration of the following detailed description of the preferred embodiment.

BRIEF DESCRIPTION OF THE DRAWINGS

Reference is made to the appended sheets of drawings In the drawings, wherein like reference numerals refer to similar components:

FIG. 3 is a block diagram showing steps for configuring a dual-crystal Pockels cell;

FIG. 4 is a diagram illustrating an improvement in pulse profile achieved using a dual-crystal Pockels cell according to the invention;

DETAILED DESCRIPTION OF THE PREFERRED EMBODIMENT

The present invention provides a system and method for reducing, eliminating, or otherwise altering sidebands in a laser pulse system. The invention is useful in optical systems using multi-element optical switches, for example, dual crystal Pockels cells, for switching of ultra-fast laser pulses.

Figure 1:
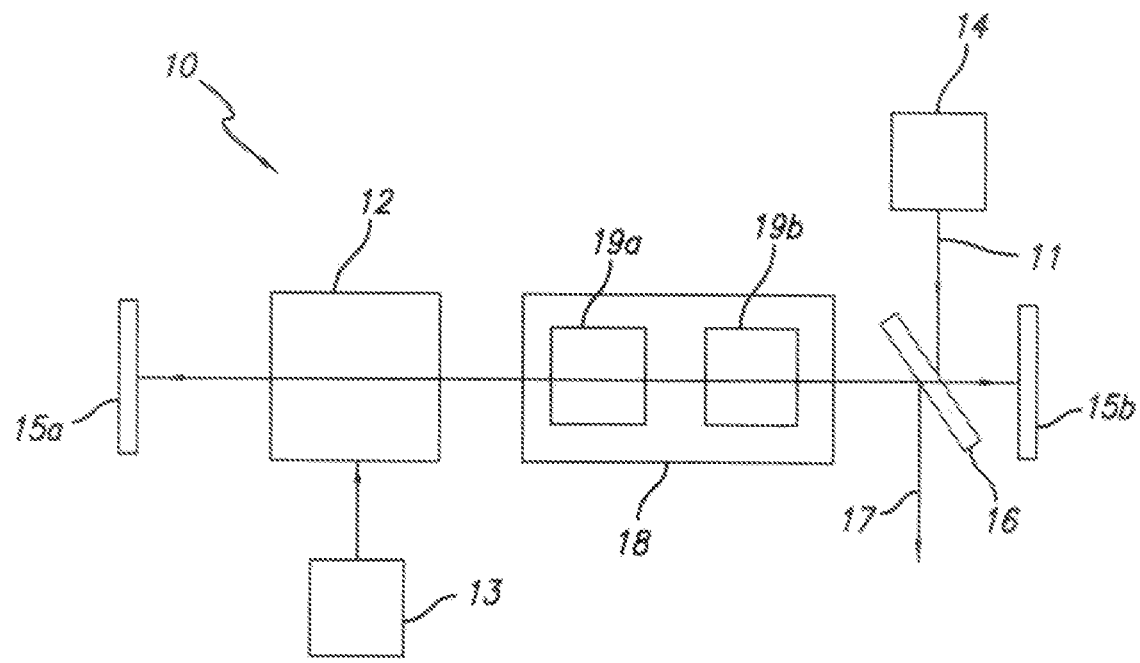
FIG. 1 is a block diagram showing a laser system incorporating a dual-crystal Pockels cell according to the invention.

FIG. 1 shows a laser system 10 employing an optical switch comprising an adjustable Pockels cell 18 having two electro-optical crystals 19a, 19b. The gain medium 12 is disposed within the optical cavity of the system 10, the optical cavity being generally defined by two mirrored surfaces 15a, 15b. The gain medium 12 is adapted to amplify a seed pulse 11 using pump power received from a pump laser 13 or other appropriate power source. The seed pulse 11 is injected into the optical cavity from a seed laser 14. The Pockels cell 18, in conjunction with the polarizer 16, controls emission of an output pulse 17 from the optical cavity. The system may comprise various other electronic or optical elements as known in the art. The invention is not limited to any particular configuration of laser system, and may be employed with any laser system making use of a multiple-element optical switch for control of pulse amplification.

Figure 2:
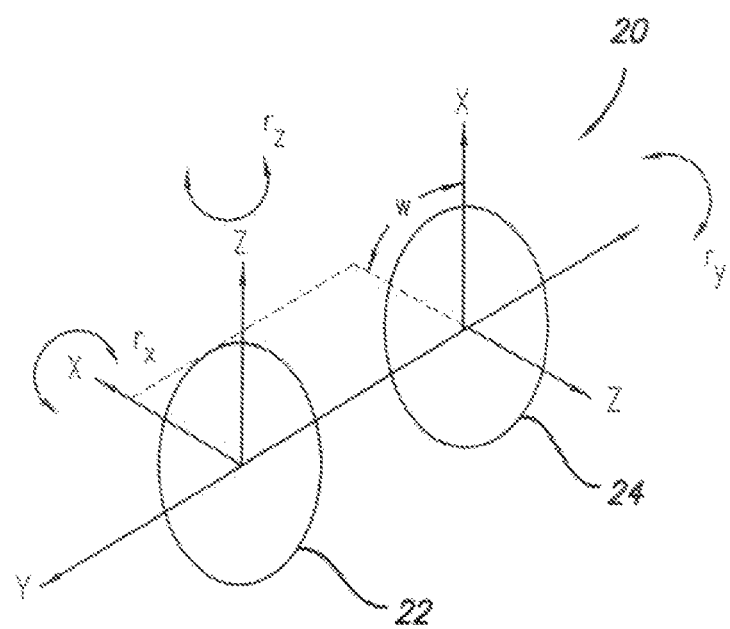
FIG. 2 is a diagram illustrating alignment of a crystal pair in a Pockels cell.

FIG. 2 shows an arrangement of electro-optical crystals in a dual-crystal Pockels cell 20. A first crystal of the cell is indicated schematically at 22. A second crystal of the cell is indicated schematically at 24. X and Z reference axes are indicated for each crystal. Light passing through each crystal is polarized at a 45° angle relative to the X and Z axes. The crystals 22, 24 are rotated to have a relative angular displacement with respect to each other. This relative angular displacement is characterized by the offset angle, $\omega$, and is usually approximately 90°. With such an orientation, the crystals 22, 24 enable additive polarization. The crystals 22, 24 are aligned such that, if placed in an optical cavity, the optical axis of the optical cavity passes through both crystals and is parallel to the Y axis of each crystal. By way of example, the first crystal 22 may be aligned with the second crystal 24 by a rotation '$r_x$' around its X axis and a rotation '$r_z$' around its Z axis. These rotations, sometimes referred to as "pitch" and "yaw" of a crystal, serve to ensure that the Y axes of the crystals 22, 24 are parallel. The precision with which this alignment is achieved is indicated by the Pockels cell's extinction ratio. The desirability of a precise alignment around the crystals' X and Z axes and of a correspondingly high extinction ratio is recognized in the art. In addition, Pockels cell 20 is configured for fine angular adjustment relative to the Y axis ('$r_y$' rotation) as further described below.

A process 30 for configuring a regenerative laser using a multi-element optical switch, such as a dual-crystal Pockels cell, are shown in FIG. 3. The process 30 may be used with the laser systems and Pockels cells disclosed herein. At step 32, the laser system is set up and operated normally to produce a laser pulse. The set-up includes placing first and second electro-optical crystals into the optical cavity, each electro-optical crystal being angularly displaced with respect to the other by an offset angle about the optical axis of the optical cavity. The seed pulse is directed into the optical cavity, and the electro-optical crystals controlled such that the seed pulse is first amplified then emitted from the optical cavity as a laser pulse.

The laser pulse is directed toward a suitable optical sensor responsive to the emitted pulse. At step 34, the sensor data is processed to provide an intensity profile for the laser pulse, using any suitable processing system as known in the art. An intensity profile is provided, for example, as an output waveform on any suitable media. FIG. 4 shows two waveforms 40, 42 such as may be observed. Time in picoseconds is indicated on the horizontal axis, and intensity is indicated on the vertical axis. The first waveform 40 shows a laser pulse with sidebands 41, such as may be observed from a laser system using a dual-crystal Pockels cell prior to rotational adjustment. The second waveform 42 shows an adjusted intensity profile, such as may be achieved after rotational adjustment of the Pockels cell crystals. For illustrative clarity, the vertical scale for the second waveform 42 is shifted upwards. In addition to minimizing or eliminating the sidebands, rotational adjustment of the Pockels cell crystals about the Y axis may also be used to tailor the intensity profile to a desired waveform. This may include increasing the intensity of the sidebands to effectively create a series of multiple pulses.

Referring again to FIG. 3, while observing the pulse intensity profile, at least one crystal of the dual-crystal Pockels cell is adjusted by being rotated about its Y axis, which is aligned with the optical axis of the optical cell. The amount of adjustment may be much smaller than the Z axis offset of the crystal pair. For example, a crystal of the pair might be adjusted within 10 minutes of arc, compared to a Z axis angular offset of 90°. Preferably, the Y axis rotational adjustment is accomplished without changing the orientation of either crystal relative to its X or Z axes, that is, their pitch or yaw. The direction of adjustment may be determined by observing the waveform of the laser pulse. To minimize or eliminate the sidebands, the adjustment is made in the direction that causes a reduction in the amplitude of the sidebands. As indicated at step 38, steps 32, 34 and 36 may be repeated until a clean waveform having significantly reduced or substantially no sidebands is observed for the laser pulses.

Figure 5:
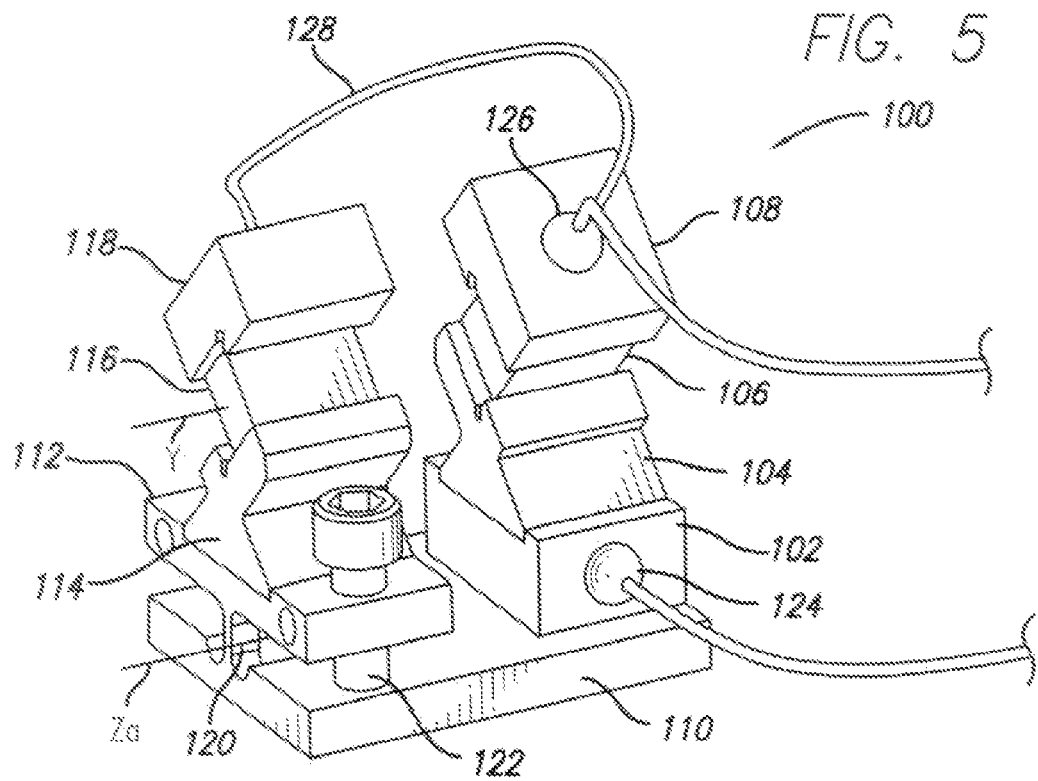
FIG. 5 is a perspective view showing a first embodiment of a dual-crystal Pockels cell mount with Y axis rotational adjustment.

FIG. 5 shows an exemplary mounting system 100 for a dual-crystal Pockels cell adapted to minimize sidebands in a laser pulse by permitting fine Y axis rotational adjustments while maintaining X axis and Z axis alignment. Structural components of the system generally comprise a thermally stable, conductive metal such as a nickel alloy or other suitable material. The system also comprises dual electro-optical crystals 106, 116 as known in the art. Suitable materials for the crystals 106, 116 may include, for example, $LiNbO_3$, KTP, RTP, RTA. Other details of the system 100 may be as known in the art.

The system 100 comprises a base 110 supporting a fixed mounting block 102 and an adjustable mounting block 112. The system 100 may be contained inside of a housing (not shown). An electrode 124 for applying a voltage to both crystals 106, 116 may be attached to the block 102, the base 110, the block 112, or other conductive structure coupled to a lower side of the crystals. The fixed mounting block 102 supports the angle block 104. The angle block 104 comprises cooperating mounting surfaces configured to locate the crystal 106 in a defined location and orientation in the x-y plane, and a defined orientation with respect to the Y axis. The crystal 106, having a generally cubic or rectangular parallelepiped shape, rests on the mounting surfaces. An upper block 108 rests on the crystal 106 opposite the angle block 104. An electrode 126 is coupled to the upper block 108 for applying a voltage across the Z axis of the crystal 106.

An adjustable mounting block 112 may be supported by a flexible web 120 formed of a resilient structural material, such as the material of the base 110 or the block 112, and a screw fastener 122. The web 120 may be configured to be relatively flexible along an axis parallel to the Y axis of the crystals 106, 116, and relatively stiff in the x-z plane. The fastener 122 may pass through a threaded hole in the adjustable mounting block 112 and be rotatably engaged in the base 110. The fastener 122 may be turned either clockwise or counter-clockwise to pivot the adjustable mounting block relative to the Y axis. As previously noted, only a small amount of adjustment is generally needed during initial configuration of the laser to provide a clean laser pulse without sidebands.

It should be apparent that the system 100 is configured such that turning the adjustment screw 122 causes rotation of crystal 116 and its associated mounting elements relative to an adjustment axis $Y_a$ defined by the flexible web 120. This $Y_a$ axis is offset from the optical Y axis passing through the crystals 116, 106. The web 120 and the mounting elements 112, 114 should be configured such that the optical Y axis and the spaced-apart $Y_a$ axis of adjustment are parallel. Adjustments of screw 122 will therefore cause angular displacement of crystal 116 relative to both axes $Y_a$ and Y'. In the alternative, a Pockels cell system may be arranged such that the axis of adjustment $Y_a$ and the optical axis Y are collinear. (On FIG. 5 Z axis should be replaced with Y)

An angle block 114 is mounted on the adjustable block 112 and holds the second crystal 116 at a defined location and orientation in the x-y plane, and at a defined offset angle relative to the first crystal 106. In the illustrated example, the offset angle is 90°. An upper block 118 rests on the crystal 116 opposite the angle block 114. Voltage is applied across the Z axis of the crystal 116 using the electrode 124 and a second electrode (not shown) on the upper block 118, coupled to the electrode 126 via a conductor 128.

Figure 6:
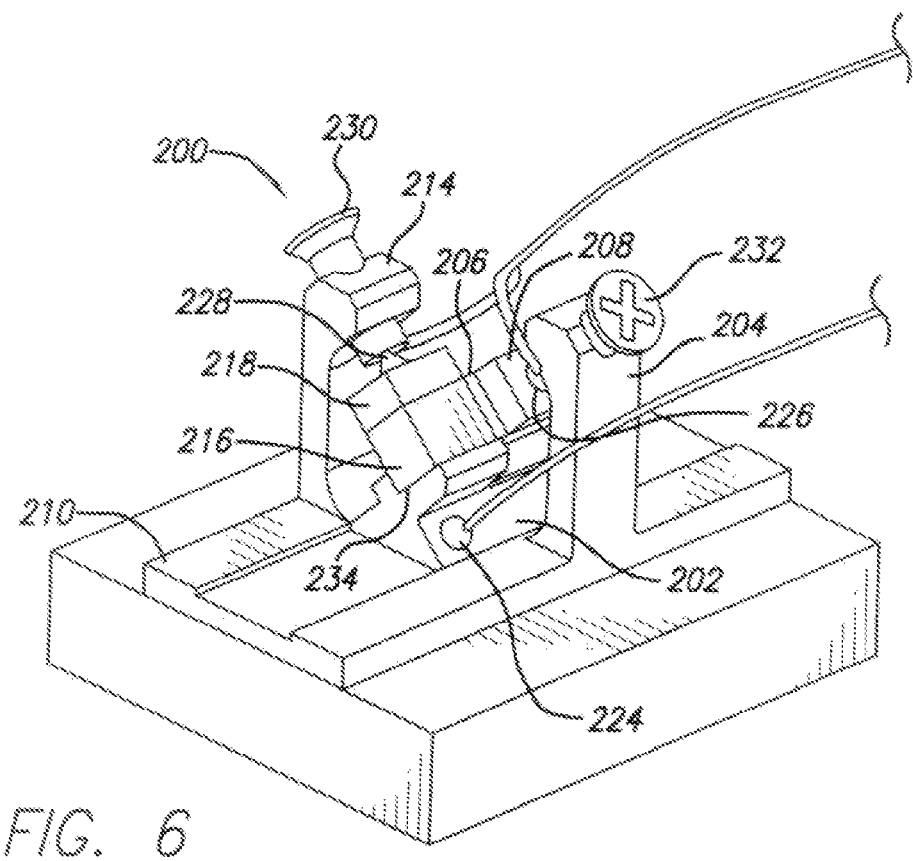
FIG. 6 is a perspective view showing a second embodiment of a dual-crystal Pockels cell mount with Y axis rotational adjustment.

FIG. 6 shows an exemplary alternative mounting system 200 for a dual-crystal Pockels cell adapted to minimize sidebands in a laser pulse by permitting fine Y axis rotational adjustments while maintaining X axis and Z axis alignment. Materials and general construction may be as described in connection with system 100, or should be apparent to one of ordinary skill. The system 200 comprises a base 210 holding an angled support block 202. The angled support block 202 may be configured to hold both crystals along a common Y axis, with one crystal rotated about the Y axis by an offset angle. In the alternative, the support block may comprise two complementary pieces oriented opposite one another, as is shown in FIG. 5. A lower electrode 224 may be coupled to the angled support block 202 for application of a control voltage.

The crystals 206, 216 rest in the angled support block 202 as previously described. The upper blocks 208 and 218 rest on the crystals 206, 216 respectively, and are coupled to the electrodes 226 and 228 for application of a control voltage. A clamp 204 with a screw 232 holds the upper block 208 and first crystal 206 in place. Likewise, a second clamp 214 and screw 230 hold the upper block 218 and second crystal 216 in place.

Either of the crystals 206 or 218 may be rotated by insertion of a very thin foil shim between the crystal and a face of the angle block 202. For example, a shim 234 may be inserted between the second crystal 216 and the angle block 202. The foil thickness and shim shape may be selected by one of ordinary skill to cause a small increment of rotation, for example, 5 minutes. Multiple shims may be used for additional rotation. Rotation in an opposite direction may be effected by shimming against an opposing support surface of the angle block 202. After the desired rotation and resulting clean laser pulse are achieved, the clamps may be secured to hold the crystals in place for operation of the laser, and no further adjustment should be necessary.

It should be noted that the methods and systems for Y axis rotational alignment are not used to achieve a theoretically perfect alignment around the Y axis. For example, the methods and systems are not used to achieve a perfect 90° Y axis alignment. Instead, the invention contemplates that a small degree of "misalignment" from the theoretically perfect rotational offset may result in a cleaner laser pulse. The exact amount of misalignment to produce optimum results may vary depending on individual variations in the crystals used, and thus the invention provides an empirical approach for determining the optimal Y axis offset for any given dual-crystal Pockels cell or other multi-element optical switch. For example, in an alternative embodiment of the invention, the optimal Y axis offset between any two crystals may be determined by using the methods disclosed herein to adjust a support and then measuring the amount of adjustment made. Fixed supports that provide this optimal alignment may be constructed to obviate the need for further adjustment. Such fixed supports having a built-in optimal degree of Y axis alignment or misalignment should also be considered within the scope of the invention.

Having thus described a preferred embodiment of a system and method for reducing or eliminating sidebands in an ultra-fast laser pulse optical system, it should be apparent to those skilled in the art that certain advantages of the within system have been achieved. It should also be appreciated that various modifications, adaptations, and alternative embodiments thereof may be made within the scope and spirit of the present invention. For example, a dual-crystal Pockels cell is illustrated, but it should be apparent that the invention may be applied in other systems using multiple electro-optical materials for additive polarization. Further, one of ordinary skill may devise other mounts for achieving optimal Y axis offset between cells, including a small degree of rotational misalignment, and the specific mounting structures disclosed herein should be regarded as merely exemplary. The invention is defined by the following claims.

What is claimed is:

1. A method of configuring a regenerative laser, the method comprising:
    placing first and second electro-optical crystals into an amplifying optical cavity, each electro-optical crystal being angularly displaced with respect to the other by an offset angle about an optical axis of the optical cavity;
    directing a seed pulse into the optical cavity;
    electrically controlling the electro-optical crystals such that the seed pulse is first amplified then emitted from the optical cavity as a laser pulse;
    observing an intensity profile of the laser pulse; and
    adjusting the offset angle by an adjustment amount so as to alter the intensity profile.

2. The method of claim 1, further comprising repeating the directing, controlling, observing, and adjusting steps so as to minimize sidebands of the intensity profile.

3. The method of claim 1, wherein the adjustment amount is substantially less than the offset angle.

4. The method of claim 1, wherein the adjusting step comprises interposing a shim between a surface of the second electro-optical crystal and a surface of the second mount.

5. The method of claim 1, wherein the adjusting step comprises turning an adjustment screw.

* * * * *